(12) United States Patent
Spencer (10) Patent No.: US 8,401,093 B2
(45) Date of Patent: Mar. 19, 2013

(54) GENERAL METHOD FOR LOW-FREQUENCY DATA TRANSMISSION ON A POWER LINE

(75) Inventor: Quentin Spencer, Champaign, IL (US)

(73) Assignee: Aclara Power-Line Systems, Inc., St. Louis, MO (US)

( * ) Notice: Subject to any disclaimer, the term of this patent is extended or adjusted under 35 U.S.C. 154(b) by 873 days.

(21) Appl. No.: 12/549,472

(22) Filed: Aug. 28, 2009

(65) Prior Publication Data

US 2010/0054349 A1    Mar. 4, 2010

Related U.S. Application Data

(60) Provisional application No. 61/092,522, filed on Aug. 28, 2008.

(51) Int. Cl.
*H04L 27/00*       (2006.01)
(52) U.S. Cl. ............................. 375/259; 178/66.1; 327/1
(58) Field of Classification Search .................. 375/259
See application file for complete search history.

(56) References Cited

U.S. PATENT DOCUMENTS

| | | | |
|---|---|---|---|
| 5,786,856 A * | 7/1998 | Hall et al. ................. | 348/403.1 |
| 6,167,079 A | 12/2000 | Kinnunen et al. | |
| 6,968,497 B2 | 11/2005 | Kaku et al. | |
| 6,995,657 B2 | 2/2006 | Zalitzky et al. | |
| 7,130,356 B2 | 10/2006 | Kaku et al. | |
| 7,251,289 B2 | 7/2007 | Kaku et al. | |
| 7,518,487 B2 | 4/2009 | Zalitzky et al. | |
| 2004/0125860 A1 | 7/2004 | Tojo et al. | |
| 2004/0174924 A1 | 9/2004 | Lakkis et al. | |
| 2006/0017324 A1 | 1/2006 | Pace et al. | |
| 2006/0202854 A1 | 9/2006 | Spencer | |
| 2007/0150796 A1 * | 6/2007 | Kim et al. ................. | 714/781 |
| 2007/0286261 A1 | 12/2007 | Moley-Shteiman | |
| 2008/0260003 A1 * | 10/2008 | Baudais ................. | 375/146 |
| 2009/0128250 A1 | 5/2009 | Roblot et al. | |
| 2010/0110875 A1 * | 5/2010 | No et al. ................. | 370/210 |
| 2010/0238978 A1 * | 9/2010 | Lele et al. ................. | 375/146 |

* cited by examiner

*Primary Examiner* — Erin File
(74) *Attorney, Agent, or Firm* — Polster, Lieder, Woodruff & Lucchesi, L.C.

(57) ABSTRACT

A method for producing a set of inbound pulse patterns and detection vectors for lengths longer than 4 cycles in an AC waveform. These are used for generating inbound messages in a two-way automatic communication system (TWACS). The method uses Hadamard matrices adapted to generate a set of detection vectors by permuting rows of a matrix and removing certain columns of the matrix to meet system design requirements. The method can be extended to any length and modified to accommodate multiple pulses per half-cycle to support higher data rates.

10 Claims, 3 Drawing Sheets

GENERAL METHOD FOR LOW-FREQUENCY DATA TRANSMISSION ON A POWER LINE

RELATED APPLICATIONS

This application derives priority from U.S. provisional patent application Ser. No. 61/092,522 filed Aug. 28, 2008

FIELD

This invention relates to communications over power lines of a utility's electrical distribution system or network using a two-way automated communications system or TWACS®; and more particularly, to a method for low-frequency data transmissions over the power lines.

In TWACS, messages sent from a source within the system (a central station, substation, or the like) to customer sites are referred to as outbound messages. These messages typically are used to check on the status of the power usage at a site (polling), convey instructions related to power usage at the site, etc. Reply messages sent from the site back to the transmission source are referred to as inbound messages. These messages are transmitted by a transponder located at the site and provide information or data about power usage at the site for use by the utility in its operations. The outbound transmission scheme employed by TWACS has been found to work reliably using only one pulse per bit. This is possible because the utility can scale up signal transmission power by using a very large signaling load.

However, the strength of an inbound transmission is limited by a number of factors. These include not only the need to avoid saturating small service transformers, but also constraints on the size, cost, and power consumption of the transmitting circuit. A result of this is that it is not always possible for the transponder to transmit a signal with adequate signal power to the substation, particularly if the transponder generates only one current pulse per bit. The signaling scheme that has evolved for inbound messages because of these constraints currently uses four pulses per bit.

At present, there is a need to reduce the amount of power required for inbound message transmissions. Doing so will alleviate a number of problems that now exist when a transponder is subjected to high source impedances, such as light flicker, harmonic distortions, and AM radio interference. In addition, reducing the instantaneous amount of current drawn by a transponder will make the TWACS more viable in situations where it is installed below a circuit breaker at the customer's site.

One way of reducing instantaneous transmission power, without sacrificing the signal-to-noise ratio at the substation, is to use longer pulse patterns for each bit in the inbound message. Each doubling of the length of a bit allows a reduction in the signaling current by a factor of $\sqrt{2}$. Thus, increasing the length of the bit from, for example, the current 8 half-cycles to 16 half-cycles, makes it possible to reduce the present current requirement of 17 amps RMS to 12 amps RMS, while maintaining the same level of performance.

SUMMARY OF THE INVENTION

The present invention is directed to a method for use in a two-way automatic communication system (TWACS) of producing a set of inbound message pulse patterns and orthogonal detection vectors for lengths longer than 4 cycles of an AC waveform. Hadamard matrices are used for this purpose and are adapted to generate a set of detection vectors by permuting rows of a matrix and removing certain columns of the matrix to meet system design requirements. The method can be extended to any length and modified to accommodate multiple pulses per half-cycle to support higher data rates. Using the method, sets of pulse patterns of an arbitrary length are produced and then used to produce longer pulse patterns usable in a TWACS for generating bits of an inbound message. Use of the method significantly reduces the power requirements for the transmission of bits comprising an inbound TWACS message.

Tables for generating "0" and "1" pulse patterns and detection vectors for channel sets of 8, 16, and 32 are presented.

Other objects and features will be in part apparent and part pointed out hereinafter.

BRIEF DESCRIPTION OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION

It will be understood by those skilled in the art that pulse patterns used to produce bits transmitted over a power line must satisfy certain system constraints. In TWACS, for example, for a pulse pattern with a length of N half-cycles, a transponder (not shown) transmits pulses in one-half of the half-cycles of a 60 Hz AC waveform in order to signal a logical "0"; and in the opposite combination of half-cycles to signal a logical "1". Accordingly, N is an even number.

Figure 1:
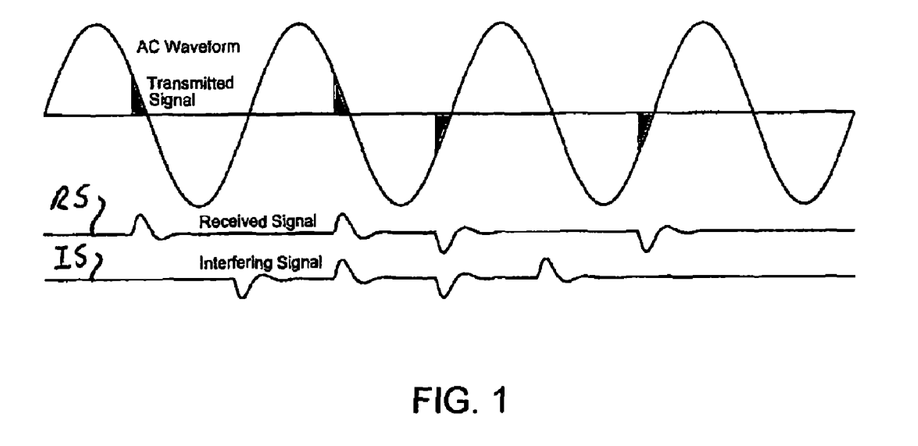
FIG. 1 illustrates a transmitted pattern of four current pulses, and the corresponding signal received at a substation after passing through a transformer of the power distribution system.

Referring to FIG. 1, a modulated waveform W is illustrated. The waveform is produced by switching a signaling load (not shown) into a circuit near the zero crossing of the AC waveform in four of eight sequential half cycles of the waveform. The polarity of each of the pulses is determined by the polarity of the AC waveform at the particular zero crossing. The pulse pattern shown here corresponds to a logical "0" in channel 4 of a set of six channels. Two additional waveforms, indicated RS and IS respectively, are also shown in FIG. 1. The signal waveform RS corresponds to the transmitted pulse pattern, and represents the logical "0" in channel 4 of the channel set. The signal waveform IS represents a logical "0" transmitted by a different transponder in a different channel; e.g., channel 3, at the same time as waveform W.

Table 1 below shows the complete set of pulse patterns for the channel set. In Table 1, a 0 represents the absence of a pulse, and a 1 or −1 respectively represents the presence of a pulse in either the positive or negative direction at a zero-crossing. It will be noted by those skilled in the art that, in addition to using exactly half of the available half-cycles to transmit pulses, each pattern contains an equal number of pulses in the positive direction and in the negative direction. This prevents any given pulse pattern from containing a net direct current (DC) component since this can cause problems in distribution transformers and because energy close to DC does not propagate well through transformers and is wasted energy. This requirement therefore implies that there must be an even number of pulses in any pattern; which, combined with the requirement that the "1" and "0" sequences have the same number of pulses, further implies that N, the total length in half-cycles, must be a multiple of 4.

TABLE 1

Pulse patterns for a logical 1 and 0 in six TWACS inbound channels of a channel set "A". Each column represents one half-cycle of an AC waveform.

| Channel # | "1" Pattern | | | | | | | | "0" Pattern | | | | | | | |
|---|---|---|---|---|---|---|---|---|---|---|---|---|---|---|---|---|
| 1 | 1 | −1 | 1 | −1 | 0 | 0 | 0 | 0 | 0 | 0 | 0 | 0 | 1 | −1 | 1 | −1 |
| 2 | 1 | −1 | 0 | 0 | 1 | −1 | 0 | 0 | 0 | 0 | 1 | −1 | 0 | 0 | 1 | −1 |
| 3 | 1 | −1 | 0 | 0 | 0 | 0 | 1 | −1 | 0 | 0 | 1 | −1 | 1 | −1 | 0 | 0 |
| 4 | 1 | 0 | 1 | 0 | 0 | −1 | 0 | −1 | 0 | −1 | 0 | −1 | 1 | 0 | 1 | 0 |
| 5 | 1 | 0 | 0 | −1 | 1 | 0 | 0 | −1 | 0 | −1 | 1 | 0 | 0 | −1 | 1 | 0 |
| 6 | 1 | 0 | 0 | −1 | 0 | −1 | 1 | 0 | 0 | −1 | 1 | 0 | 1 | 0 | 0 | −1 |

TABLE 2

Decode vectors for each of the six TWACS inbound channels. Each column represents one half-cycle of the AC waveform.

| Channel # | Decode Vector | | | | | | | |
|---|---|---|---|---|---|---|---|---|
| 1 | 1 | −1 | 1 | −1 | −1 | 1 | −1 | 1 |
| 2 | 1 | −1 | −1 | 1 | 1 | −1 | −1 | 1 |
| 3 | 1 | −1 | −1 | 1 | −1 | 1 | 1 | −1 |
| 4 | 1 | 1 | 1 | 1 | −1 | −1 | −1 | −1 |
| 5 | 1 | 1 | −1 | −1 | 1 | 1 | −1 | −1 |
| 6 | 1 | 1 | −1 | −1 | −1 | −1 | 1 | 1 |

Table 2 above shows the detection vectors for the channel set associated with the pulse patterns listed in Table 1. The signals are detected by adding and subtracting the contents of each half cycle according to the appropriate detection vector listed in Table 2. So, if a "1" is transmitted in channel 4, the output of the detection is the inner product of:
[1 0 1 0 0 −1 0 −1][1 1 1 1 −1 −1 −1 −1]$^T$=4

The inner product of the "0" sequence with the detection vector is −4, and the inner product with any "1" or "0" sequence from any of the other channels is 0. By using this detection scheme, the interfering signal IS from a different channel, as shown in FIG. 1, is removed.

To characterize the detection process mathematically for a generalized set of channel patterns, let a vector $p_0$ represent a pulse pattern for a "0" in some arbitrary channel, let a vector $p_1$ represent the corresponding pulse pattern for a "1" in that channel, and let a vector d represent the corresponding detection vector. The goal in the design of detection vector d is that it contains the values 1 and −1 arranged in a pattern such that the inner product of $p_1$ and d is N/2, and the inner product of $p_0$ and d is −N/2. It can be shown that this is achieved when $$d = p_1 - p_0. \tag{1}$$

The pulse patterns $p_0$ and $p_1$ are derived from detection vector d by observing that regardless of their contents, if $p_1$ and $p_1$ follow the two design constraints outlined previously, then $$p_1 + p_0 = [1\ -1\ 1\ -1\ \ldots] \equiv q. \tag{2}$$

By adding or subtracting a vector q on both sides of equation (1), we obtain the following:

$$p_0 = \frac{1}{2}(q+d) \tag{3}$$

and $$p_1 = \frac{1}{2}(q-d) \tag{4}$$

Therefore, since it is possible to derive pulse patterns for a given channel from the detection vector for that channel, one need only focus on designing a set of orthogonal detection vectors.

To create a set of M channels of length N, a set of detection vectors are created which are mutually orthogonal. It will be understood by those skilled in the art that these vectors need only be linearly independent, but orthogonal patterns are desirable because they simplify the detection procedure. The orthogonality constraint can be stated mathematically by collecting the detection vectors into an N×M detection matrix D such that:

$$D = [d_1\ d_2 \ldots d_M], \tag{5}$$

with the orthogonality constraint expressed as:

$$D^T D = NI. \tag{6}$$

The constraint that $p_0$ and $p_1$ for any of the channels have as many 1s as −1s can be alternatively stated as a requirement that the elements of the vector sum to zero; or, if 1 is an N-dimensional vector containing all ones, then $p_0^T 1 = p_1^T 1 = 1$. Equation (1) implies that $d_j^T 1 = 0$ for all j so that $$D^T 1 = 0 \tag{7}$$

The constraint that $p_0$ and $p_1$ each have exactly N/2 non-zero elements is equivalent to requiring that the inner products $p_0^T q = p_1^T q = N/2$. Applying equation (1) now leads to the constraint on $d_j$ that $d_j^T q = 0$, which implies that:

$$D^T q = 0 \tag{8}$$

Equations (6)-(8) comprise all of the design constraints on finding a set of detection vectors. Any given detection vector $d_j$ must be orthogonal to all other vectors, as well as to 1 and q, so that:

$$[d_1\ d_2 \ldots d_{j-1}\ d_{j+1} \ldots d_M\ q\ 1]^T d_j = 0 \tag{9}$$

Since it is only possible for a $d_j$ of dimension N to be orthogonal to an N−1 dimensional subspace, the maximum size of the matrix on the left side of equation (9) is N−1×N. Since two of the columns in the matrix are not d vectors, it follows that the maximum value of M is N−2. Accordingly, the problem is to find an orthonormal set of M=N−2 vectors of length N containing the values +1 and −1 that satisfy the constraints of equations (7) and (8).

A set of detection vectors that meets these design constraints can be found by a brute-force search of possible patterns. This was done for the original TWACS design where N=8, which produces 6 different possible sets of 6 orthogonal channels. However, since the computational complexity of such a search is proportional to 2N, this approach quickly becomes unrealistic for larger values of N. Another way of finding valid sets of orthogonal detection vectors is to make use of existing orthogonal designs such as Hadamard matrices as discussed hereinafter.

A Hadamard matrix is defined as an n×n matrix H containing only the elements 1 and −1, such that $$HH^T = nI_n$$

The size n of a Hadamard matrix must be 1, 2, or an integer multiple of 4. It has been conjectured, but not yet proven, that Hadamard matrices exist for n equal to all integer multiples of 4. For designing TWACS transmission schemes, it is sufficient that there are known Hadamard matrix designs for relatively small n. For sizes where $n=2^k$, there is a method for constructing a Hadamard matrix. It can be shown that if H is a Hadamard matrix of order n, the matrix $$\begin{bmatrix} H & H \\ H & -H \end{bmatrix}$$

is a Hadamard matrix of order 2n. Given this identity, and the fact that $H_1=1$ is a Hadamard matrix of order 1, it follows that $$H_2 = \begin{bmatrix} 1 & 1 \\ 1 & -1 \end{bmatrix}$$

and that a Hadamard matrix of order $2^k$ can be constructed by repeated applications of the following:

$$H_{2^k} = \begin{bmatrix} H_{2^{k-1}} & H_{2^{k-1}} \\ H_{2^{k-1}} & -H_{2^{k-1}} \end{bmatrix} = H_2 \otimes H_{2^{k-1}},$$

where ⊗ is the Kronecker product.

Using a Hadamard matrix of size n to generate a set of detection vectors for TWACS signaling requires the detection vectors to be mutually orthogonal to each other, and to the vectors [q 1]. This is achieved by insuring that two of the columns of H are respectively equal to q and 1. Then, discarding those two columns and setting detection matrix D to the remaining columns of H, yields the desired N−2 orthogonal detection vectors. If the matrix already contains 1 and q as two of its columns, such as would occur when using the construction method outlined above, then the set of detection vectors is complete.

Since many Hadamard matrices do not already contain the vectors 1 and q, the matrix must be modified to meet these conditions. This can be done by permuting rows or columns in the matrix, or inverting the sign of entire rows or columns therein. Either approach preserves the orthogonality properties of the Hadamard matrix. Many Hadamard matrices contain 1 as one of their columns, but where they do not, a column containing all ones can be created by inverting the signs of some of the rows in the matrix. For matrices that do not contain q as one of their columns, it is possible to permute rows of the matrix until one of the columns is equal to q. For example, take a Hadamard matrix of order 12:

$$H_{12} = \begin{bmatrix} 1 & 1 & 1 & 1 & 1 & 1 & 1 & 1 & 1 & 1 & 1 & 1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \\ 1 & 1 & -1 & 1 & 1 & 1 & -1 & -1 & -1 & 1 & -1 & -1 \end{bmatrix}$$

The matrix contains 1 as one of its columns, but does not contain q. By arbitrarily selecting the second column as the one to be modified to equal q, and by re-ordering the rows of H12, it is possible to create a matrix that contains 1 as its first column and q as its second column as shown below:

$$H_{12} = \begin{bmatrix} 1 & 1 & 1 & 1 & 1 & 1 & 1 & 1 & 1 & 1 & 1 & 1 \\ 1 & -1 & 1 & -1 & 1 & 1 & 1 & -1 & -1 & -1 & 1 & -1 \\ 1 & 1 & -1 & -1 & 1 & -1 & 1 & 1 & 1 & -1 & -1 & -1 \\ 1 & -1 & -1 & 1 & 1 & 1 & 1 & -1 & -1 & -1 & 1 \\ 1 & 1 & -1 & -1 & -1 & 1 & -1 & -1 & 1 & -1 & 1 & 1 \\ 1 & -1 & 1 & -1 & -1 & 1 & -1 & 1 & 1 & 1 & -1 & -1 \\ 1 & 1 & 1 & -1 & -1 & -1 & 1 & -1 & -1 & 1 & -1 & 1 \\ 1 & -1 & -1 & 1 & -1 & -1 & 1 & -1 & 1 & 1 & 1 & -1 \\ 1 & 1 & 1 & 1 & -1 & -1 & -1 & 1 & -1 & -1 & 1 & -1 \\ 1 & -1 & -1 & -1 & 1 & -1 & -1 & 1 & -1 & 1 & 1 & 1 \\ 1 & 1 & -1 & 1 & 1 & 1 & -1 & -1 & -1 & 1 & -1 & -1 \\ 1 & -1 & 1 & 1 & 1 & -1 & -1 & -1 & 1 & -1 & -1 & 1 \end{bmatrix}$$

A set of ten (10) detection vectors for a TWACS transmission scheme involving 12 half-cycles of an AC waveform can then be taken from columns 3-12 of matrix $H_{12}$.

Figure 2:
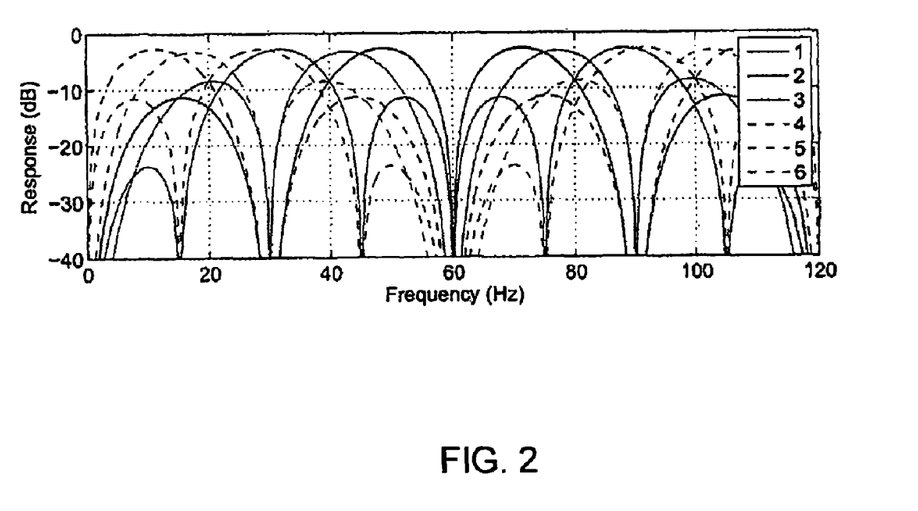
FIG. 2 illustrates the frequency response of channel detection vectors for a channel set 8A in the current TWACS protocol.

The frequency content of TWACS inbound signals is different for each TWACS channel. The content is specified by two components: the shape of the pulses and the repetition patterns of the pulses. The pulse shapes are not a function of the particular channel, but of the power-line and local characteristics where the transponder is generating its signal. The inbound signal can be modeled as a convolution of the pulse shape with a series of impulses, so we can treat the frequency content of a particular channel as the product of the frequency content of the channel pattern and the frequency content of the pulse shape. Since detection vectors are matched filters for each channel, the frequency content of each channel is found by computing the Fourier transform of the detection vector. FIG. 2 shows the frequency content of signals for channel set A in the current TWACS protocol on a power distribution system with a 60 Hz AC frequency. The frequency responses shown in FIG. 2 end at 120 Hz because they are periodic with a period of 120 Hz. Therefore, the frequency content between 120-240 Hz is the same as that between 0-60 Hz, and so forth. Note that for a 50 Hz AC frequency, the spectral shape of each of the channels would be the same, but periodic with a period of 100 Hz instead.

It will be noted that for each channel shown in FIG. 2, the majority of its energy occurs at slightly different frequencies from the other channels. This helps explain some of the differences in performance sometimes seen between one channel and another. Heretofore, channel 1 has been observed as having the worst performance. In FIG. 2, it is seen that channel 1 has most of its energy near 60 Hz. This implies that, at higher frequencies, most of its energy is close to the odd harmonics of 60 Hz which adversely affects signal detection because it is common to find increased noise levels near the odd harmonics of the AC frequency. In addition to signal detection problems, placing significant energy near 60 Hz also causes the additional problem of light flicker. Light flicker is caused by low-frequency modulation of the AC signal used to power incandescent light bulbs. Placing significant signal energy near the AC frequency is effectively the equivalent of modulating the at a low frequency; so, channels with the most energy near the AC frequency are those most prone to light flicker. This effect can be reduced by modifying the shape of inbound pulses to reduce their low-frequency content; but problems associated with placing signal energy near odd harmonics remain.

The connection between frequency content of a channel and its detection vector can be seen by observing that channels 4 and 6 in FIG. 2 have most of their energy concentrated at low frequencies, and that the corresponding detection vectors listed in Table 2 have few sign changes. A detection vector with few sign changes is analogous to a low frequency Fourier transform basis function. The connection between the number of sign changes in a vector and frequency is referred to as "sequency". Hadamard matrices constructed in accordance with the method described above can be ordered in sequency order by indexing them using Gray codes with a bit-reversed order; that is, the most significant bit is incremented first.

Figure 3:
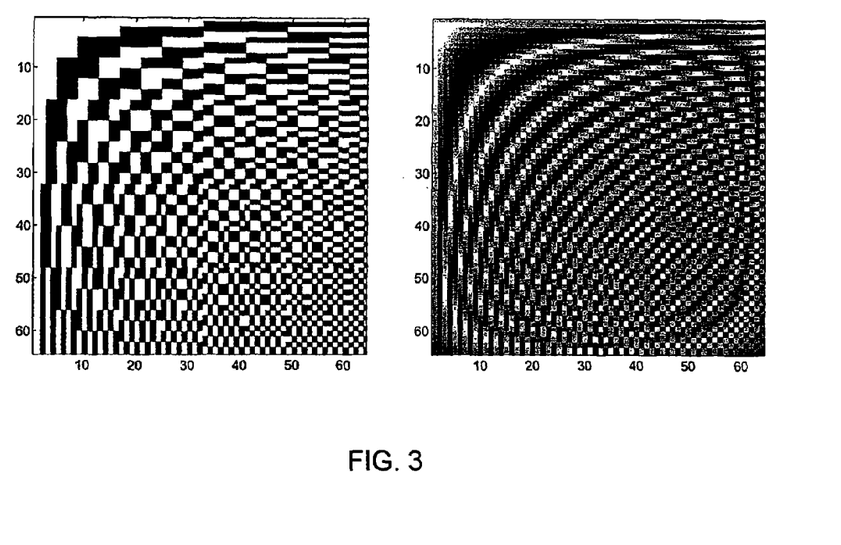
FIG. 3 presents a comparison of a sequency-ordered Hadamard matrix of size 64 (left side of the Fig.) and a Discrete Cosine Transform matrix of size 64 (right side of the Fig.)

Referring to FIG. 3, what is shown is a comparison of a sequency ordered Hadamard matrix and a discrete cosine transform (DCT) matrix, both of size 64. The DCT matrix is a real valued transform with properties similar to a Fourier transform. In the FIG. 3 comparison, the sequency-ordered Hadamard matrix has a structure similar to that of the DCT matrix. In this ordering, the first vector corresponds to direct current (DC) and the last vector to the vector q, the two vectors that do not meet the design constraint.

Figure 4:
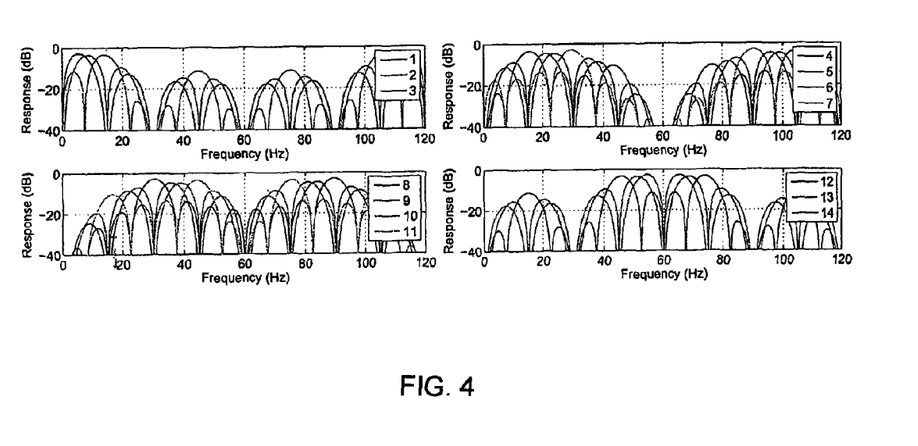
FIG. 4 presents a comparison of the frequency content of 14 channels in a channel group 16, where the channels are ordered in sequency order; and, FIG. 5 represents the frequency response of hypothetical channel detection vectors for 8 half-cycles with 2 current pulses per cycle.

With the first and last vectors removed (because they correspond to vectors q and 1), the actual frequency content of the remaining 14 vectors for a length of 16 is illustrated in FIG. 4. Here, the first detection vectors have their frequency content concentrated close to DC, while the last vectors have their frequency content concentrated close to 60 Hz; and, by extension, its odd harmonics. From the previous discussion of desirable properties of TWACS channels, it will be understood that this ordering puts the channels in order of desirability. Accordingly, future channel sets are defined in sequency order. In situations where not all channels are required, the channels should be used in an order such that the last and least desirable channel is the least frequently used.

Since there exist N−2 viable pulse patterns of length N, the aggregate throughput of a TWACS system with length N pulse patterns will be $$\frac{N-2}{N}2f,$$

where f is the AC frequency, and 2f the number of half-cycles per second. Because of this, the ratio (N−2)/N can be thought of as the efficiency of the channel set of length N, and the ratio asymptotically approaches 1 as N becomes large. As an example, the efficiency of channel sets of length 8 is 3/4, while that of channel sets of length 16 is 7/8. This increased efficiency makes it possible to completely avoid some channels yet still obtain the same efficiency as a smaller channel set. Thus, an efficiency of 3/4 can still be maintained even if channels 13 and 14, the two least desirable channels in channel set 16, are not used. Taken even further, with a channel set 32, channels 25-30 could all be avoided while still maintaining an efficiency of 3/4.

The principles previously set forth for designing a general set of detection vectors and pulse patterns assumed there is one time slot per half cycle of the AC waveform for transmitting a current pulse. A way of increasing the data rate of TWACS is to "squeeze" more than one pulse into each half cycle. This is not currently possible when a silicon-controlled rectifier (SCR) is used as the switching device to insert a load into the circuit, but there are other alternatives which make this possible. Since this scenario will change some of the underlying assumptions for designing pulse patterns, the design procedure needs to be modified accordingly.

Consider, for example, the situation where there are two pulses per half-cycle. Here, the evenly spaced pulses at $\pi/4$, $3\pi/4$, $5\pi/4$, and $7\pi/4$ radians all yield roughly the same amplitude. This scenario does not change equation (1), but does change the definition of q in equation (2). Now, the signs in q must match the polarity of the transmitted pulses, so q will be:

$$q=[1\ 1\ -1\ -1\ 1\ 1\ \ldots]^T.$$

Again, a Hadamard matrix of size N can be arranged so it contains the vectors 1 and the new definition of q, and these two vectors are removed to give the final set of detection vectors.

Figure 5:
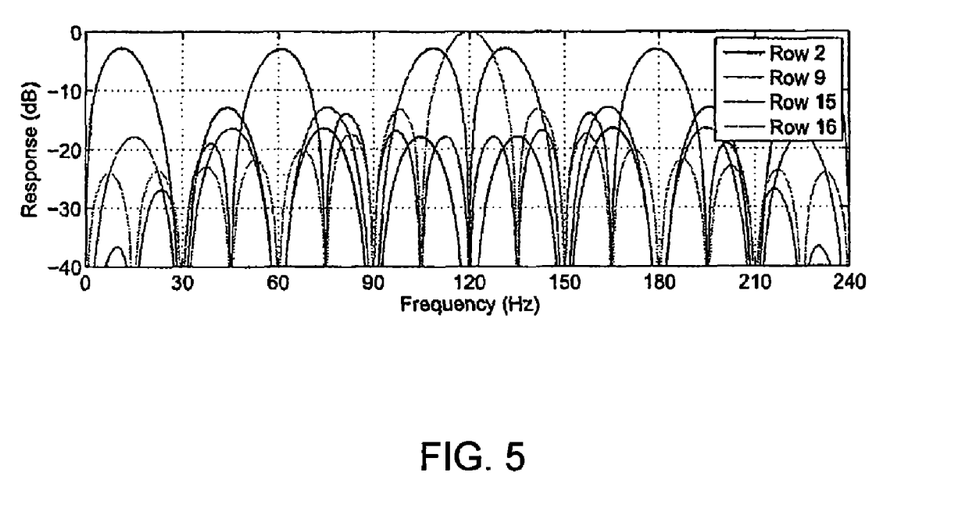

For a sequency-ordered Hadamard matrix of size 16, instead of deleting rows 1 and 16, rows 1 and 8 are now deleted. From this matrix, the pulse patterns $p_0$ and $p_1$ for transmitting "0" and "1" are derived by again applying equations (3) and (4) using the new definition of q. FIG. 5 shows the frequency response with 2 pulses per half-cycle of rows 2, 9, 15, and 16 of the sequency-ordered Hadamard matrix of size 16. It will be noted that instead of being periodic every 120 Hz, the frequency response is now periodic every 240 Hz. However, this causes some additional problems because, although they meet the initial design constraints, the frequency characteristics of rows 9 and 16 show that they carry all of their information content in the odd and even harmonics of 60 Hz, respectively. The relative strength of TWACS inbound signals relative to harmonics of the AC waveform is low enough that placing the energy at these harmonics makes the signals very difficult to detect. Accordingly, those rows in the Hadamard matrix should not be used. This means rows 1, 8, 9, and 16 are not used which leaves a total of 12 out of 16 channels and an efficiency of 3/4.

With the sequency-ordered Hadamard matrix, each row has a frequency characteristic with a peak that progresses from DC in the first row, to 60 Hz for the last row. Now that the progression is from 0 to 120 Hz, the last row avoids putting energy near 60 Hz just as well as the first row. This implies that if we continue to define desirability of a channel in terms of the amount of energy placed near 60 Hz, the sequency-ordered Hadamard matrix should be reordered as follows:

$$\{1,N,2,N-1,\ldots,N/2-1,N/2+2,N/2,N/2+1\}$$

With this ordering, the first two rows and last two rows are the ones deleted, leaving the remaining detection vectors in order of preference. This same procedure can also be applied to longer vectors for values of $N=2^k$ with the same results. The significance of this is that for a general TWACS-like transmission scheme involving two pulses per half-cycle, every set of pulse patterns of length N will have a length N−4, and the efficiency of the channel set will be $$\frac{N-4}{N}.$$

Efficiency is now multiplied by 4f instead of 2f in this instance in order to obtain maximum achievable throughput.

What has been described is a general scheme for designing detection vectors and pulse patterns of any length of a TWACS inbound transmission. Inbound transmissions using current pulses involve a few design constraints, which, in turn, impose limits on the number of channels that can be created of a particular length. These design constraints can, however, be met by manipulating Hadamard matrices of the desired size.

Finally, proposed channel patterns of lengths 16 and 32 are presented in the following tables. These were constructed using sequency-ordered Hadamard matrices in which the first and last vectors which do not meet the design constraints are dropped. The result is a set of channels ordered in their approximate order of desirability, with the first channels minimizing the energy near 60 Hz and the odd harmonics thereof, and the last channels containing significant energy near those frequencies.

For patterns of length 16, Tables 3 and 4 present the pulse patterns for transmitting a "0" and "1", respectively. Table 5 presents the corresponding detection vectors.

For patterns of length 32, Tables 6 and 7 present pulse patterns for transmitting a "0" and "1", respectively. Table 8 presents the corresponding detection vectors.

TABLE 3

Channel Set 16, Pulse Patterns for Logical "0"

| Channel # | Pattern |
|---|---|
| 1 | 0 −1 0 −1 0 −1 0 −1 1 0 1 0 1 0 1 0 |
| 2 | 0 −1 0 −1 1 0 1 0 1 0 1 0 0 −1 0 −1 |
| 3 | 0 −1 0 −1 1 0 1 0 0 −1 0 −1 1 0 1 0 |
| 4 | 0 −1 1 0 1 0 0 −1 0 −1 1 0 1 0 0 −1 |
| 5 | 0 −1 1 0 1 0 0 −1 1 0 0 −1 0 −1 1 0 |
| 6 | 0 −1 1 0 0 −1 1 0 1 0 0 −1 0 0 −1 |
| 7 | 0 −1 1 0 0 −1 1 0 0 −1 1 0 −1 1 0 |
| 8 | 0 0 1 −1 0 0 1 −1 0 0 1 −1 0 0 1 −1 |
| 9 | 0 0 1 −1 0 0 1 −1 1 −1 0 0 1 −1 0 0 |
| 10 | 0 0 1 −1 1 −1 0 0 1 −1 0 0 0 1 −1 |
| 11 | 0 0 1 −1 1 −1 0 0 0 0 1 −1 1 −1 0 0 |
| 12 | 0 0 0 0 1 −1 1 −1 1 0 0 0 0 1 −1 −1 1 −1 |
| 13 | 0 0 0 0 1 −1 1 −1 1 −1 1 −1 0 0 0 0 |

TABLE 3-continued

Channel Set 16, Pulse Patterns for Logical "0"

| Channel # | Pattern |
|---|---|
| 14 | 0 0 0 0 0 0 0 1 −1 1 −1 1 1 −1 1 −1 |

TABLE 4

Channel Set 16, Pulse Patterns for Logical "1"

| Channel # | Pattern |
|---|---|
| 1 | 1 0 1 0 1 0 1 0 0 −1 0 −1 0 −1 0 −1 |
| 2 | 1 0 1 0 0 −1 0 −1 0 −1 0 −1 1 0 1 0 |
| 3 | 1 0 1 0 0 −1 0 −1 1 0 1 0 0 −1 0 −1 |
| 4 | 1 0 0 −1 0 −1 1 0 1 0 0 −1 0 −1 1 0 |
| 5 | 1 0 0 −1 0 −1 1 0 0 −1 1 0 1 0 0 −1 |
| 6 | 1 0 0 −1 1 0 0 −1 0 −1 1 0 −1 1 0 |
| 7 | 1 0 0 −1 1 0 0 −1 1 0 0 −1 1 0 0 −1 |
| 8 | 1 −1 0 0 1 −1 0 0 1 −1 0 0 1 −1 0 0 |
| 9 | 1 −1 0 0 1 −1 0 0 0 0 1 −1 0 0 1 −1 |
| 10 | 1 −1 0 0 0 0 1 −1 0 0 1 −1 1 −1 0 0 |
| 11 | 1 −1 0 0 0 0 1 −1 1 −1 0 0 0 0 1 −1 |
| 12 | 1 −1 1 −1 0 0 0 0 1 −1 1 −1 0 0 0 0 |
| 13 | 1 −1 1 −1 0 0 0 0 0 0 0 1 −1 1 −1 |
| 14 | 1 −1 1 −1 1 −1 1 −1 1 0 0 0 0 0 0 0 0 |

TABLE 5

Channel Set 16, Detection Vectors

| Channel # | Pattern |
|---|---|
| 1 | 1 1 1 1 1 1 1 1 −1 −1 −1 −1 −1 −1 −1 −1 |
| 2 | 1 1 1 1 −1 −1 −1 −1 −1 −1 −1 −1 1 1 1 1 |
| 3 | 1 1 1 1 −1 −1 −1 −1 1 1 1 1 −1 −1 −1 −1 |
| 4 | 1 1 −1 −1 −1 −1 1 1 1 1 −1 −1 −1 −1 1 1 1 |
| 5 | 1 1 −1 −1 −1 −1 1 1 1 −1 −1 1 1 1 1 1 −1 −1 |
| 6 | 1 1 −1 −1 1 1 1 −1 −1 −1 −1 1 1 1 −1 −1 1 1 1 |
| 7 | 1 1 −1 −1 1 1 1 −1 −1 1 1 1 −1 −1 1 1 1 −1 −1 |
| 8 | 1 −1 −1 1 1 1 −1 −1 1 1 1 −1 −1 1 1 1 −1 −1 1 1 |
| 9 | 1 −1 −1 1 1 1 −1 −1 1 1 −1 1 1 1 −1 −1 1 1 1 −1 |
| 10 | 1 −1 −1 1 1 −1 1 1 1 −1 −1 1 1 1 −1 −1 1 1 |
| 11 | 1 −1 −1 1 1 −1 1 1 1 −1 1 −1 −1 1 1 −1 1 1 |
| 12 | 1 −1 1 −1 −1 1 −1 1 1 1 −1 1 −1 −1 1 −1 1 1 −1 1 1 |
| 13 | 1 −1 1 −1 −1 1 −1 1 1 −1 1 −1 −1 1 −1 1 1 −1 1 −1 |

TABLE 5-continued

Channel Set 16, Detection Vectors

| Channel # | Pattern |
|---|---|
| 14 | 1 −1 1 −1 1 −1 1 −1 −1 1 1 −1 1 −1 1 |

TABLE 6

Channel Set 32, Pulse Patterns for Logical "0"

| Channel # | Pattern |
|---|---|
| 1 | 0 −1 0 −1 0 −1 0 −1 0 −1 0 −1 0 −1 0 −1 1 0 1 0 1 0 1 0 1 0 1 0 1 0 |
| 2 | 0 −1 0 −1 0 −1 0 −1 1 0 1 0 1 0 1 0 1 0 1 0 1 0 0 −1 0 −1 0 −1 |
| 3 | 0 −1 0 −1 0 −1 0 −1 1 0 1 0 1 0 1 0 0 −1 0 −1 0 −1 1 1 0 1 0 1 0 |
| 4 | 0 −1 0 −1 1 0 1 0 1 0 1 0 0 −1 0 −1 0 −1 0 −1 1 0 1 0 1 0 0 −1 0 −1 |
| 5 | 0 −1 0 −1 1 0 1 0 1 0 1 0 0 −1 0 −1 1 0 1 0 0 −1 0 −1 0 −1 0 −1 1 0 1 0 |
| 6 | 0 −1 0 −1 1 0 1 0 0 −1 0 −1 1 0 1 0 1 0 1 0 0 −1 0 −1 1 0 1 0 0 −1 0 −1 |
| 7 | 0 −1 0 −1 1 0 1 0 0 −1 0 −1 1 0 1 0 0 −1 0 −1 1 0 1 0 0 −1 0 −1 1 0 1 0 |
| 8 | 0 −1 1 0 1 0 0 −1 0 −1 1 0 1 0 0 −1 0 −1 1 0 1 0 0 −1 0 −1 1 0 1 0 0 −1 |
| 9 | 0 −1 1 0 1 0 0 −1 0 −1 1 0 1 0 0 −1 1 0 0 −1 0 −1 1 0 1 0 0 −1 0 −1 1 0 |
| 10 | 0 −1 1 0 1 0 0 −1 1 0 0 −1 1 0 1 0 0 −1 0 −1 1 0 1 0 0 −1 1 0 0 −1 |
| 11 | 0 −1 1 0 1 0 0 −1 1 0 0 −1 1 0 0 −1 1 0 1 0 0 −1 1 0 0 −1 1 0 1 0 |
| 12 | 0 −1 1 0 0 −1 1 0 1 0 0 −1 1 0 0 −1 1 0 1 0 0 −1 1 0 0 −1 1 0 1 0 |
| 13 | 0 −1 1 0 0 −1 1 0 1 0 0 −1 1 0 0 −1 1 0 0 −1 1 0 0 −1 1 0 0 −1 1 0 0 −1 |
| 14 | 0 −1 1 0 0 −1 1 0 0 −1 1 0 0 −1 1 0 1 0 0 −1 1 0 0 −1 1 0 0 −1 1 0 |
| 15 | 0 −1 1 0 0 −1 1 0 0 −1 1 0 0 −1 1 0 0 −1 1 0 0 −1 1 0 0 −1 1 0 0 −1 |
| 16 | 0 0 1 −1 0 0 1 −1 0 0 1 −1 0 0 1 −1 0 0 1 −1 0 0 1 −1 0 0 1 −1 |
| 17 | 0 0 1 −1 0 0 1 −1 0 0 1 −1 0 0 1 −1 1 −1 0 0 1 −1 0 0 1 −1 0 0 |
| 18 | 0 0 1 −1 0 0 1 −1 1 −1 0 0 1 −1 0 0 1 −1 0 0 1 −1 0 0 0 0 1 −1 0 0 1 −1 |
| 19 | 0 0 1 −1 0 0 1 −1 1 −1 0 0 1 −1 0 0 0 0 1 −1 0 0 1 −1 1 −1 0 0 1 −1 0 0 |
| 20 | 0 0 1 −1 1 −1 0 0 1 −1 0 0 0 0 1 −1 0 0 1 −1 1 −1 0 0 1 −1 0 0 0 0 1 −1 |
| 21 | 0 0 1 −1 1 −1 0 0 1 −1 0 0 0 0 1 −1 1 −1 0 0 0 0 1 −1 1 −1 0 0 |
| 22 | 0 0 1 −1 1 −1 0 0 0 0 1 −1 1 −1 0 0 1 −1 0 0 0 0 1 −1 1 −1 0 0 0 0 1 −1 |
| 23 | 0 0 1 −1 1 −1 0 0 0 0 1 −1 1 −1 0 0 0 0 1 −1 1 −1 0 0 0 0 1 −1 1 −1 0 0 |
| 24 | 0 0 0 0 1 −1 1 −1 0 0 0 0 1 −1 1 −1 0 0 0 0 1 −1 1 −1 0 0 0 0 1 −1 1 −1 |
| 25 | 0 0 0 0 1 −1 1 −1 0 0 0 0 1 −1 1 −1 1 −1 1 −1 0 0 0 0 1 −1 1 −1 0 0 0 0 |
| 26 | 0 0 0 0 1 −1 1 −1 1 −1 1 −1 0 0 0 0 1 −1 1 −1 0 0 0 0 0 0 0 1 −1 1 −1 |
| 27 | 0 0 0 0 1 −1 1 −1 1 −1 1 −1 0 0 0 0 0 0 0 1 −1 1 −1 1 −1 1 −1 0 0 0 0 |
| 28 | 0 0 0 0 0 0 0 0 1 −1 1 −1 1 −1 1 −1 0 0 0 0 0 0 0 1 −1 1 −1 1 −1 1 −1 |
| 29 | 0 0 0 0 0 0 0 0 1 −1 1 −1 1 −1 1 −1 1 −1 1 −1 1 −1 1 −1 1 −1 0 0 0 0 0 0 0 |
| 30 | 0 0 0 0 0 0 0 0 0 0 0 0 0 0 0 0 1 −1 1 −1 1 −1 1 −1 1 −1 1 −1 1 −1 1 −1 |

TABLE 7

Channel Set 32, Pulse Patterns for Logical "1"

| Channel # | Pattern |
|---|---|
| 1 | 1 0 1 0 1 0 1 0 1 0 1 0 1 0 1 0 0 −1 0 −1 0 −1 0 −1 0 −1 0 −1 0 −1 0 −1 |
| 2 | 1 0 1 0 1 0 1 0 0 −1 0 −1 0 −1 0 −1 0 −1 0 −1 0 −1 0 −1 1 0 1 0 1 0 |
| 3 | 1 0 1 0 1 0 1 0 0 −1 0 −1 0 −1 0 −1 1 0 1 0 1 0 1 0 0 −1 0 −1 0 −1 |
| 4 | 1 0 1 0 0 −1 0 −1 0 −1 0 −1 1 0 1 0 1 0 1 0 0 −1 0 −1 0 −1 0 −1 1 0 1 0 |
| 5 | 1 0 1 0 0 −1 0 −1 0 −1 0 −1 1 0 1 0 0 −1 0 −1 1 0 1 0 1 0 0 −1 0 −1 |
| 6 | 1 0 1 0 0 −1 0 −1 1 0 1 0 0 −1 0 −1 0 −1 0 −1 1 0 1 0 0 −1 0 −1 1 0 1 0 |
| 7 | 1 0 1 0 0 −1 0 −1 1 0 1 0 0 −1 0 −1 1 0 1 0 0 −1 0 −1 1 0 1 0 0 −1 0 −1 |
| 8 | 1 0 0 −1 0 −1 1 0 1 0 0 −1 0 −1 1 0 1 0 0 −1 0 −1 1 0 1 0 0 −1 0 −1 1 0 |
| 9 | 1 0 0 −1 0 −1 1 0 1 0 0 −1 0 −1 1 0 0 −1 1 0 1 0 0 −1 0 −1 1 0 0 −1 |
| 10 | 1 0 0 −1 0 −1 1 0 0 −1 1 0 1 0 0 −1 0 −1 1 0 1 0 0 −1 1 0 0 −1 1 0 |
| 11 | 1 0 0 −1 0 −1 1 0 0 −1 1 0 0 −1 1 0 1 0 0 −1 1 0 0 −1 1 0 1 0 0 −1 |
| 12 | 1 0 0 −1 1 0 0 −1 1 0 0 −1 1 0 1 0 0 −1 1 0 0 −1 1 0 0 −1 1 0 1 0 |
| 13 | 1 0 0 −1 1 0 0 −1 1 0 0 −1 1 0 0 −1 1 0 0 −1 1 0 0 −1 1 0 0 −1 1 0 0 −1 |
| 14 | 1 0 0 −1 1 0 0 −1 1 0 0 −1 1 0 0 −1 1 0 0 −1 1 0 0 −1 1 0 0 −1 1 0 0 −1 |
| 15 | 1 0 0 −1 1 0 0 −1 1 0 0 −1 1 0 0 −1 1 0 0 −1 1 0 0 −1 1 0 0 −1 1 0 0 −1 |
| 16 | 1 −1 0 0 1 −1 0 0 1 −1 0 0 1 −1 0 0 1 −1 0 0 1 −1 0 0 1 −1 0 0 1 −1 |
| 17 | 1 −1 0 0 1 −1 0 0 1 −1 0 0 1 −1 0 0 0 0 1 −1 0 0 1 −1 0 0 1 −1 0 0 1 −1 |
| 18 | 1 −1 0 0 1 −1 0 0 0 0 1 −1 0 0 1 −1 0 0 1 −1 0 0 1 −1 1 −1 1 −1 0 0 1 −1 0 0 |
| 19 | 1 −1 0 0 1 −1 0 0 0 0 1 −1 0 0 1 −1 1 −1 0 0 1 −1 1 0 0 0 0 1 −1 0 0 1 −1 |
| 20 | 1 −1 0 0 0 0 1 −1 0 0 1 −1 1 −1 0 0 1 −1 0 0 0 0 1 −1 1 −1 1 −1 0 0 |
| 21 | 1 −1 0 0 0 0 1 −1 0 0 1 −1 1 −1 0 0 0 0 1 −1 1 −1 0 0 1 −1 0 0 0 0 1 −1 |
| 22 | 1 −1 0 0 0 0 1 −1 1 −1 0 0 0 0 1 −1 0 0 1 −1 1 −1 0 0 0 0 1 −1 1 −1 0 0 |
| 23 | 1 −1 0 0 0 0 1 −1 1 −1 0 0 0 0 1 −1 1 −1 0 0 0 0 1 −1 1 −1 0 0 0 0 1 −1 |
| 24 | 1 −1 1 −1 0 0 0 0 1 −1 1 −1 0 0 0 0 1 −1 1 −1 0 0 0 0 1 −1 1 −1 0 0 0 0 |
| 25 | 1 −1 1 −1 0 0 0 0 1 −1 1 −1 0 0 0 0 0 0 0 1 −1 1 −1 0 0 0 0 1 −1 1 −1 |
| 26 | 1 −1 1 −1 0 0 0 0 0 0 0 1 −1 1 −1 0 0 0 0 1 −1 1 −1 1 −1 1 −1 0 0 0 0 |
| 27 | 1 −1 1 −1 0 0 0 0 0 0 0 1 −1 1 −1 1 −1 1 −1 1 −1 0 0 0 0 0 0 0 0 1 −1 1 −1 |
| 28 | 1 −1 1 −1 1 −1 1 −1 0 0 0 0 0 0 0 0 1 −1 1 −1 1 −1 1 −1 0 0 0 0 0 0 0 0 |
| 29 | 1 −1 1 −1 1 −1 1 −1 0 0 0 0 0 0 0 0 0 0 0 0 0 0 0 0 1 −1 1 −1 1 −1 1 −1 |
| 30 | 1 −1 1 −1 1 −1 1 −1 1 −1 1 −1 1 −1 1 −1 1 −1 0 0 0 0 0 0 0 0 0 0 0 0 0 |

TABLE 8

Channel Set 32, Detection Vectors

| Channel # | Pattern |
|---|---|
| 1 | 1 1 1 1 1 1 1 1 1 1 1 1 1 1 1 1 −1 −1 −1 −1 −1 −1 −1 −1 −1 −1 −1 −1 −1 −1 −1 −1 |
| 2 | 1 1 1 1 1 1 1 1 −1 −1 −1 −1 −1 −1 −1 −1 −1 −1 −1 −1 −1 −1 −1 −1 1 1 1 1 1 1 1 1 |
| 3 | 1 1 1 1 1 1 1 1 −1 −1 −1 −1 −1 −1 −1 −1 1 1 1 1 1 1 1 1 −1 −1 −1 −1 −1 −1 −1 −1 |

TABLE 8-continued

Channel Set 32, Detection Vectors

| Channel # | Pattern |
|---|---|
| 4 | 1 1 1 1 -1 -1 -1 -1 -1 -1 -1 -1 1 1 1 1 1 1 1 1 -1 -1 -1 -1 -1 -1 -1 -1 1 1 1 1 |
| 5 | 1 1 1 1 -1 -1 -1 -1 -1 -1 -1 -1 1 1 1 1 -1 -1 -1 -1 1 1 1 1 1 1 1 1 -1 -1 -1 -1 |
| 6 | 1 1 1 1 -1 -1 -1 -1 1 1 1 1 -1 -1 -1 -1 -1 -1 -1 -1 1 1 1 1 -1 -1 -1 -1 1 1 1 1 |
| 7 | 1 1 1 1 -1 -1 -1 -1 1 1 1 1 -1 -1 -1 -1 1 1 1 1 -1 -1 -1 -1 1 1 1 1 -1 -1 -1 -1 |
| 8 | 1 1 -1 -1 -1 -1 1 1 -1 -1 1 1 -1 -1 -1 -1 1 1 1 1 -1 -1 1 1 -1 -1 -1 -1 1 1 -1 -1 |
| 9 | 1 1 -1 -1 -1 -1 1 1 1 1 -1 -1 -1 -1 1 1 -1 -1 1 1 1 1 -1 -1 -1 -1 1 1 1 1 -1 -1 |
| 10 | 1 1 -1 -1 -1 -1 1 1 1 -1 -1 1 1 -1 -1 1 1 1 1 -1 -1 -1 -1 1 1 1 1 -1 -1 -1 -1 1 1 1 |
| 11 | 1 1 -1 -1 -1 -1 1 1 1 -1 -1 1 1 1 1 -1 -1 1 1 -1 -1 1 1 1 -1 -1 1 1 1 1 -1 -1 1 |
| 12 | 1 1 -1 -1 1 1 1 -1 -1 1 -1 -1 1 1 1 -1 -1 1 1 1 1 1 -1 -1 1 1 1 -1 -1 1 -1 -1 1 1 1 |
| 13 | 1 1 -1 -1 1 1 1 -1 -1 -1 -1 1 1 1 -1 -1 1 1 1 -1 -1 1 1 1 -1 -1 1 1 1 1 1 -1 -1 1 1 1 -1 -1 |
| 14 | 1 1 -1 -1 1 1 1 -1 -1 -1 -1 1 1 1 -1 -1 1 1 1 -1 -1 1 1 1 -1 -1 1 1 1 -1 -1 1 1 1 |
| 15 | 1 1 -1 -1 1 1 1 -1 -1 1 1 1 -1 -1 1 1 1 -1 -1 1 1 1 -1 -1 1 1 -1 -1 1 1 1 -1 -1 1 1 1 -1 -1 |
| 16 | 1 -1 -1 1 1 1 -1 -1 1 1 1 -1 -1 1 1 1 -1 -1 1 1 1 -1 -1 1 1 1 -1 -1 1 1 1 -1 -1 1 1 |
| 17 | 1 -1 -1 1 1 1 -1 -1 1 1 1 -1 -1 1 1 1 -1 -1 1 1 -1 -1 1 1 1 -1 -1 1 1 1 -1 -1 1 1 1 -1 |
| 18 | 1 -1 -1 1 1 1 -1 -1 1 1 -1 -1 1 1 1 -1 -1 1 1 1 -1 -1 1 1 1 -1 -1 1 1 -1 -1 1 1 -1 -1 1 1 1 -1 |
| 19 | 1 -1 -1 1 1 -1 -1 1 1 1 -1 -1 1 1 1 -1 -1 1 1 1 -1 -1 1 1 -1 -1 1 1 1 -1 -1 1 1 1 -1 |
| 20 | 1 -1 -1 1 1 -1 1 1 1 -1 -1 1 1 1 -1 -1 1 1 -1 -1 1 1 1 -1 -1 1 1 -1 -1 1 1 1 -1 -1 1 1 -1 |
| 21 | 1 -1 -1 1 1 -1 -1 1 1 1 -1 -1 1 1 -1 -1 1 1 -1 -1 1 1 -1 1 -1 -1 1 1 -1 -1 1 1 1 -1 |
| 22 | 1 -1 -1 1 1 -1 -1 1 1 1 -1 -1 1 1 -1 -1 1 1 -1 -1 1 1 1 -1 1 1 1 -1 1 -1 -1 1 1 -1 -1 1 1 1 -1 |
| 23 | 1 -1 -1 1 1 -1 -1 1 1 1 -1 -1 1 1 -1 -1 1 1 -1 -1 1 1 -1 1 -1 -1 1 1 -1 -1 1 1 -1 -1 1 1 |
| 24 | 1 -1 1 -1 -1 1 1 -1 1 1 -1 -1 1 1 -1 -1 1 1 -1 -1 1 1 -1 1 1 -1 -1 1 -1 -1 1 1 -1 -1 1 1 -1 |
| 25 | 1 -1 1 -1 -1 1 1 -1 1 1 -1 -1 1 1 -1 -1 1 1 -1 -1 1 -1 -1 1 1 -1 1 -1 -1 1 -1 -1 1 1 -1 -1 1 1 |
| 26 | 1 -1 1 -1 -1 1 1 -1 1 1 -1 -1 1 1 -1 1 1 -1 -1 1 1 -1 -1 1 -1 -1 1 1 -1 1 -1 -1 1 1 -1 |
| 27 | 1 -1 1 -1 -1 1 1 -1 1 1 -1 -1 1 1 -1 -1 1 1 -1 -1 1 1 -1 -1 1 1 -1 1 1 -1 -1 1 1 -1 |
| 28 | 1 -1 1 -1 1 -1 -1 1 -1 1 1 -1 1 -1 -1 1 1 -1 -1 1 -1 1 1 -1 1 -1 -1 1 -1 1 1 -1 1 -1 -1 1 |
| 29 | 1 -1 1 -1 1 -1 1 -1 -1 1 -1 1 -1 1 -1 1 -1 -1 1 -1 1 1 -1 1 -1 1 1 -1 1 -1 -1 1 -1 |
| 30 | 1 -1 1 -1 1 -1 1 -1 1 -1 1 -1 1 -1 1 -1 1 -1 1 -1 1 -1 1 -1 1 -1 1 -1 1 -1 1 -1 |

What is claimed is:

1. A method of producing a set of pulse patterns and detection vectors for lengths longer than 4 cycles in an AC waveform for use in generating inbound messages in a two-way automatic communication system (TWACS) comprising:
selecting a Hadamard matrix of a size n×n where n is the number of rows and columns in the matrix;
manipulating rows and columns of the Hadamard matrix;
selecting a set of columns of the matrix as a set of detection vectors;
using the detection vectors to create pulse patterns representing logical "0" and "1";
combining the transmitted pulse patterns with the set of detection vectors to create a detection matrix; and
generate inbound messages for the TWACS by applying the detection matrix to detect signals imposed on the AC waveform at predetermined locations.

2. The method of claim 1 in which the value n for determining the size of the Hadamard matrix is 1, 2, or an integer multiple of 4.

3. The method of claim 1 in which the Hadamard matrix is manipulated to generate the set of detection vectors by permuting rows of the matrix and by deleting selected columns of the matrix.

4. The method of claim 3 in which the Hadamard matrix is further manipulated to generate the set of detection vectors by inverting the sign of an entire row or an entire column in the matrix.

5. The method of claim 4 in which the resulting matrix is a sequency ordered Hadamard matrix.

6. The method of claim 5 in which the TWACS employs a set of channels for communications, and the method includes deleting rows from the Hadamard matrix which represent those channels in the set of channels on which an inbound message will be difficult to detect.

7. The method of claim 6 in which the deleted rows represent detection vectors for channels whose frequency content is concentrated near the AC frequency and odd harmonics thereof.

8. The method of claim 1 in which the design constraints include avoiding a DC component in the signal and further avoiding a frequency component in the signal that is at substantially the same frequency as the AC waveform.

9. The method of claim 5 in which the Hadamard matrix is ordered in sequency by indexing it using a Gray code with a bit-reversed order in which the most significant bit is incremented first.

10. The method of claim 9 in which, after sequency ordering, the detection vectors remaining in the Hadamard matrix are arranged in order of preference.

* * * * *